Patented May 5, 1931

1,803,488

UNITED STATES PATENT OFFICE

EDGAR S. ROSS, OF PITTSBURGH, PENNSYLVANIA, ASSIGNOR TO THE PHILIP CAREY MANUFACTURING COMPANY, A CORPORATION OF OHIO

BITUMINOUS COMPOSITION

No Drawing.   Application filed May 20, 1927.  Serial No. 193,068.

My invention relates to a bituminous composition and process of manufacture of same.

It is in the nature of a bituminous emulsion and the product produced by my process is a liquid or semi-liquid material composed of a water carrier containing minute particles of bituminous material in suspension. This product may be termed a bituminous emulsion. Such a product at normal temperatures, can, without heat, be readily used in the manufacturing arts or can be applied to surfaces or structures where it is desired to form a film of bituminous material for waterproofing or other purposes.

When my bituminous composition is used in the manufacturing arts or is applied as stated, the water carrier evaporates, leaving a film composed of the fine particles of bituminous material which were in suspension and which, as the water carrier evaporates, by reason of their adhesive character, become amalgamated into a continuous body.

Heretofore, in the production of bituminous emulsions, it has been the practice to use various aids to emulsification such as clays and other like material. When, however, these aids have been used, the bituminous composition produced, contained all of these materials and when used in the manufacturing arts or for water-proofing, these materials remained in the film or body that was finally produced when the water carrier had evaporated. As such aids did not have the same water-proofing or similar qualities that the bituminous material possesses, they were useless in the final use to which the bituminous composition was put. The presence of these aids to emulsification is in the nature of contamination of the waterproofing asphaltic material used, and as such, reduces the water-proofing effectiveness of the final asphaltic film, while my product is, as stated above, free from such contamination.

My process I will, for convenience, divide into three steps as follows:

*First step.*—The bituminous material, preferably asphalt, having been selected, I dissolve it by the use of a suitable solvent; for instance, asphalt may be dissolved by using benzene as a solvent. Of course, other solvents may be used, such as carbon tetra-chloride, carbon disulphide and any similar suitable solvent. This mixture of asphalt and solvent is agitated so as to create a solution of asphalt in the solvent, thus reducing the asphalt to its most finely divided condition, that is, in solution. From this solution is obtained the asphalt in condition for use in the next step by driving off or evaporating the bulk of the solvent, retaining, however, a small amount of the solvent to prevent the soft plastic-like asphaltic mass obtained from returning to its original state of continuity.

*Second step.*—I then take the water which I use as a carrier, make it slightly alkaline by the use of a small proportion of suitable alkaline salt, such as caustic soda, caustic potash, sodium carbonate, or any other suitable alkaline salt. This slightly alkaline water is heated to a temperature at or near its boiling point.

*Third step.*—The slightly alkaline water heated to a temperature near its boiling point, is now ready to receive the soft plastic like mass of asphalt and solvent which was produced in the first step. This asphalt-solvent plastic-like mass produced in the first step is composed of fine particles of asphalt kept independent of each other by the solvent which forms a protective film around the fine particles. Into the warm alkaline water, I now pour the soft plastic-like mass of asphalt-solvent (produced in the first step) while the water is being rapidly agitated and as the asphalt-solvent plastic-like mass comes into contact with the agitated warm alkaline water, the fine particles of asphalt are immediately dispersed throughout the mass. As the water is warm,—above the boiling point of the solvent,—simultaneously with the dispersion of the particles of the asphalt throughout the mass, the solvent is expelled. When sufficient of the product of Step No. 1 has been introduced into the alkaline water in this Step No. 3 so as to obtain the desired consistency of the final product which may be liquid or semi-liquid or plastic, depending upon the use for which the material is produced, the product is allowed to cool. As a result of this third step of my process, the solvent has been expelled, thereby removing the protective film of solvent that was produced around the particles of asphalt and which kept the particles of asphalt separated from each other (as a result of the first step) and, substituting for that protective film a separating medium in the form of the alkaline water, and producing a bituminous composition in the form of a stable suspension or emulsion, such, that when the water evaporates after the material has been used in the arts or applied to a structure, permits the particles of asphalt to coalesce and again form a homogeneous mass of asphalt possessing the water-proofing characteristics and like qualities of the original asphalt which was used at the beginning of the first step.

Claims:

1. The process of producing a bituminous composition comprising dissolving bituminous material in a volatile solvent having a boiling point lower than that of water, driving off the major part of said solvent, gradually adding the solution of bituminous material to a dilute aqueous alkaline solution substantially free from foreign material heated at normal atmospheric pressure to a temperature slightly above the boiling point of the volatile solvent but not substantially above the boiling point of water, simultaneously agitating the mixture and driving off the remainder of the volatile solvent.

2. The process of producing an asphaltic composition comprising dissolving asphalt in benzene, driving off the major part of said benzene from the asphalt-benzene solution, gradually adding said solution to a body of water heated at normal atmospheric pressure to a temperature above the boiling point of the benzene and containing substantially only a small quantity of alkali without other impurities, simultaneously agitating the mixture and driving off the remainder of the benzene.

3. The process of producing a bituminous aqueous emulsion containing substantially no contaminating impurities, which comprises dissolving bituminous material in a volatile solvent having a boiling point lower than that of water, gradually adding the solution of bituminous material to a dilute aqueous alkaline solution substantially free from foreign material and heated under atmospheric pressure to a temperature slightly above the boiling point of the solvent but not substantially above the boiling point of water, simultaneously agitating the mixture and driving off the volatile solvent.

4. A bituminous aqueous emulsion obtained according to claim 3.

In testimony whereof, I have signed my name to this specification.

EDGAR S. ROSS.